July 24, 1956  E. R. CUNNINGHAM  2,756,013
RESILIENT MOUNTING
Filed Jan. 4, 1954
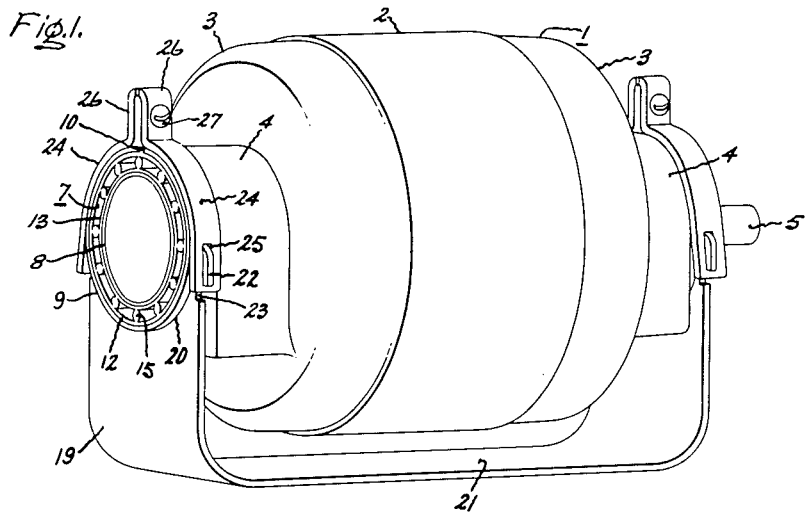
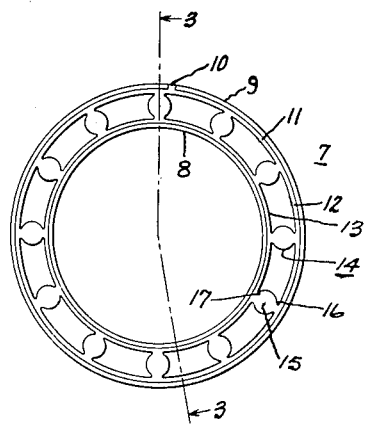
Inventor:
Eldon R. Cunningham,
by *Robert G. [signature]*
His Attorney.

United States Patent Office 2,756,013
Patented July 24, 1956

2,756,013
RESILIENT MOUNTING

Eldon R. Cunningham, Fort Wayne, Ind., assignor to General Electric Company, a corporation of New York Application January 4, 1954, Serial No. 402,029

3 Claims. (Cl. 248—26)

This invention relates to small dynamo-electric machines and more particularly to an improved resilient mounting for such machines.

It is often necessary in small dynamo-electric machines to provide a mounting which will prevent transmission of undue vibrations to the motor base. A relatively common mounting of this type is disclosed in Patent 2,074,136 to A. F. Welch, issued March 16, 1937, and assigned to the assignee of the present application, wherein an annulus of rubber is bonded to an inner ring and an outer ring. The inner ring is secured to a hub of the machine while the outer ring is secured to the base of the machine. The annulus of rubber will then provide sufficient flexibility so that vibrations from the inner ring of the mounting will not be transmitted to the outer ring which is connected to the base. It is desirable in mountings of this type to provide high torsional resilience. In other words, the ratios of torsional to radial resilience and torsional to axial resilience should be made as high as possible in order to isolate effectively the vibrations and to provide adequate stiffness against radial shaft loading.

The necessity for such high vibration-absorbing qualities becomes clear when it is realized that the magnitude of flux in a standard 60 cycle alternating current motor changes 120 times per second and that there will be a reaction in the motor stator in response to each change in flux magnitude. Since the stator is secured to the frame of the motor, this reaction will be translated into vibrations of the motor frame. Furthermore the variation of the flux in most motors will cause these vibrations to put torsional stress, rather than axial or radial stress, on the resilient mounting. In the past it has been necessary to use a relatively soft grade of rubber in order to isolate properly the motor vibrations. Such softer grades of rubber are far more susceptible to heat, oil and aging than the harder grades and provide an undesirably low radial load capacity. Therefore, while in the past a soft grade of rubber has been necessary to achieve the proper torsional resilience this softness has shortened the life and effectiveness of the mounting. It is therefore desirable to achieve a resilient mounting in which a relatively hard grade of resilient material may be used while keeping the torsional resilience at a high value.

It is, therefore, an object of this invention to provide an improved resilient mounting for dynamo-electric machines which will incorporate the desirable qualities enumerated above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention provides, in one embodiment thereof, a resilient mounting wherein inner and outer metal rings are provided. These rings are spaced apart, one being secured to the hub of the machine and the other to the base thereof, and an annular resilient member is provided between the metal rings. This rubber member comprises a thin strip bonded to each of the rings. Connecting the two strips are segments which are relatively narrow at the points where they are connected to the thin strips and relatively wide between the strips. The wide central portions provide ample support under radial stress and are made to extend at least for a substantial portion of the axial length of the annular resilient member so that the axial resilience will remain the same as in previous mountings of this type. The narrow connections to the strips, which extend for substantially the axial length of the central portions, distort when the mounting is placed under torsional stress. In other words, one side of the narrow piece will be under compression and the other side will be under tension, and there will be very little shearing stress imposed upon the segments. This effect permits the wide central portions to act almost as roller bearings and to give under torsional pressure without, however, being able to rotate completely since they are held by the narrow pieces joining them to the thin strips. This mounting made up of the two metal rings with the resilient annulus therebetween is fitted over a hub of the machine and is clamped to the base thereof.

In the drawing,

Figure 1 is a view in perspective of a motor fitted with the novel mounting means of this invention;

Figure 2 is a front view of the resilient mounting means of this invention; and

Figure 3 is a cross section of the improved resilient mounting through lines 3—3 of Figure 2.

Referring now to the figures of the drawing, there is shown a dynamo-electric machine, in this instance a small electric motor, generally designated as 1. Motor 1 has a cylindrical shell 2 which encloses a stator (not shown) which is normally formed of thin laminations. A pair of end shields 3 are provided to close the ends of shell 2. Each end shield 3 is provided with a hub portion 4 which encloses a bearing structure for the motor shaft 5. The resilient mounting of this invention, generally indicated at 7, is mounted about each hub portion 4. Mounting means 7 has a pair of rings 8 and 9 of rigid material, such as a suitable metal. Ring 8 is made as a solid piece and is tightly fitted onto hub portion 4. Ring 9 is not necessarily made continuous, but in its finished form may have a small split, as at 10 . This permits a more economical manufacturing process, and is readily permissible since ring 9 may be held tightly by compression and is not to be in tension as is required of ring 8. Between the rings 8 and 9 there is provided an annulus 11 which may be made of rubber or any other material having adequate resilient properties. This annulus has a thin strip portion 12 which is bonded to ring 9, and another thin strip portion 13 which is bonded to ring 8. A number of segments 14 are spaced around annulus 11. Each of these segments has a roller-like center portion 15 having a cross section approximating a circle to achieve the roller effect, and relatively narrow portions 16 and 17 which integrally join roller-like portion 15 to strips 12 and 13 respectively. Mounting 7 may easily be manufactured by conventional compression molding.

Outer ring 9 has an annular groove 18 which accommodates a base 19 having an arcuate recess 20 which co-acts with groove 18. It will be seen that base 19 extends completely under motor 1, supporting it by means of flat portion 21, and is secured to both mountings 7 at each end of motor 1. Any standard means, such as those shown in the aforesaid Patent 2,074,136, Welch, may be used to secure motor 1 to base 19. These may include for instance, latch ears 22 formed in base 19 and having recesses 23 directly therebelow. A pair of clamps 24 are provided with openings 25 through which latches 22 project when clamps 24 are assembled thereon. These clamps terminate at their upper ends in upright flanges 26 which are secured together by a threaded member 27. Tightening of threaded member 27 causes the clamps to anchor firmly the outer ring 9 and the arcuate recess 20 of base 21 together. It will be understood that other means may be used to secure motor 1 and base 19 together, and that the above construction is not a vital part of the improved mounting of this invention.

It will be seen that a resilient mounting is provided which will isolate to a great extent the vibrations of motor 1 without letting them reach base 21 on which the motor is mounted. It will also be seen that roller-like portions 15 provide this resilient mounting with an ample amount of radial stiffness and strength. The width of segments 14, best seen in Figure 3, also provides this mounting with as much axial strength as previous mountings of this type. It is, however, when the mounting has to absorb torsional vibrations that its great advantage appears; as resilient mountings were previously made, torsional vibrations caused shearing stress in the mounting. For proper torsional resilience this meant that the rubber had to be of a relatively soft grade. In the present invention, however, a torsional vibration will cause narrow portions 16 and 17 to distort. One side of the narrow portion will be stressed in tension while the other side will be stressed in compression as the roller like part 15 tends to rotate under the torsional stress, and there will be very little shearing stress brought about. Because of this, a much harder grade of rubber may be used. When soft grades of rubber are used, they are by their nature much more vulnerable to aging, deterioration by oil, and heat, and other unwanted factors. The use of a harder grade of rubber permits the elimination of these disadvantages since harder rubber may be made resistant to oil and heat much more easily than soft rubber. Thus it will be seen that this invention provides a resilient mounting which provides many advantages because it affords a far greater torsional resilience comparatively to the radial and axial resiliences than was previously obtainable.

While this invention has been explained by describing a particular embodiment thereof it will be apparent that improvements and modifications may be made without departing from the scope of the invention as defined in the appended claims.

What I claim as new and desire to secure by Letters Patent of the United States is:

1. For use with rotatable machinery, a resilient mounting ring comprising a pair of radially spaced concentric rings of rigid material; and an annulus of resilient material between said rings, said annulus comprising a pair of concentric radially spaced thin strips respectively bonded to the inner surface of the outer of said rings and to the outer surface of the inner of said rings, and a plurality of equispaced portions between said strips, each of said portions being formed substantially as a cylinder extending for a substantial portion of the axial length of said annulus, each of said cylinders having a diameter substantially equal to the distance between said strips, said cylinders being joined substantially across their axial lengths to said strips by relatively narrow sections whereby said sections distort when one of said rings is turned relative to the other of said rings.

2. For use with rotatable machinery, a resilient mounting ring comprising a pair of radially spaced concentric rings of rigid material; and an annulus of resilient material between said rings, said annulus comprising a pair of concentric radially spaced strips respectively bonded to the inner surface of the outer of said rings and to the outer surface of the inner of said rings, and a pluraltiy of portions each having a radial cross-section approximating a circle between said strips, said portions extending radially substantially the entire distance between said strips and axially a substantial portion of the axial length of said annulus, and a pair of relatively narrow sections joining each said portion substantially across its axial length to said strips respectively.

3. For use with rotatable machinery, a resilient mounting ring comprising a pair of radially spaced concentric rings of rigid material; and an annulus of resilient material between said rings, said annulus comprising a pair of concentric radially spaced thin strips respectively bonded to the inner surface of the outer of said rings and to the outer surface of the inner of said rings, and a plurality of circumferentially equispaced portions each having a radial cross section approximating a circle between said strips, said portions extending radially substantially the entire distance between said strips and axially a substantial portion of the axial length of said strips, and a pair of relatively narrow sections joining each said portions substantially across its axial length to said strips respectively.

References Cited in the file of this patent

UNITED STATES PATENTS

| | | |
|---|---|---|
| 519,807 | Cloud | May 15, 1894 |
| 1,369,389 | Browne | Feb. 22, 1921 |
| 2,178,077 | Loftis | Oct. 31, 1939 |
| 2,296,221 | Pontis | Sept. 15, 1942 |

FOREIGN PATENTS

| | | |
|---|---|---|
| 140,465 | Great Britain | June 20, 1921 |